(12) United States Patent
Yawalkar et al.

(10) Patent No.: US 8,584,092 B2
(45) Date of Patent: Nov. 12, 2013

(54) METHODS AND SYSTEMS OF DETERMINING RISK LEVELS OF ONE OR MORE SOFTWARE INSTANCE DEFECTS

(75) Inventors: Shrirang V Yawalkar, Flower Mound, TX (US); Balaji Kumar, Irving, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 738 days.

(21) Appl. No.: 12/413,745

(22) Filed: Mar. 30, 2009

(65) Prior Publication Data

US 2010/0251215 A1 Sep. 30, 2010

(51) Int. Cl.
*G06F 9/44* (2006.01)

(52) U.S. Cl.
USPC .......................... 717/125; 717/101; 717/105

(58) Field of Classification Search
None
See application file for complete search history.

(56) References Cited

U.S. PATENT DOCUMENTS

| | | | | |
|---|---|---|---|---|
| 6,978,441 | B2 * | 12/2005 | Atwood et al. | 717/125 |
| 7,401,321 | B2 * | 7/2008 | Sit et al. | 717/125 |
| 7,603,653 | B2 * | 10/2009 | Sundararajan et al. | 717/105 |
| 7,747,987 | B1 * | 6/2010 | Akarte et al. | 717/131 |
| 7,856,616 | B2 * | 12/2010 | Chang et al. | 717/101 |
| 7,890,924 | B2 * | 2/2011 | Raffo | 717/105 |
| 7,917,897 | B2 * | 3/2011 | Bassin et al. | 717/131 |
| 8,423,963 | B2 * | 4/2013 | Garbers et al. | 717/125 |
| 2003/0066049 | A1 * | 4/2003 | Atwood et al. | 717/101 |
| 2003/0188290 | A1 * | 10/2003 | Corral | 717/101 |
| 2004/0205727 | A1 * | 10/2004 | Sit et al. | 717/125 |
| 2005/0060213 | A1 * | 3/2005 | Lavu et al. | 705/7 |
| 2005/0114829 | A1 * | 5/2005 | Robin et al. | 717/101 |
| 2007/0150084 | A1 * | 6/2007 | Grubb et al. | 700/110 |
| 2008/0201611 | A1 * | 8/2008 | Bassin et al. | 714/37 |
| 2009/0055795 | A1 * | 2/2009 | Finlayson et al. | 717/101 |
| 2009/0249299 | A1 * | 10/2009 | Farchi et al. | 717/125 |
| 2010/0011338 | A1 * | 1/2010 | Lewis | 717/105 |

OTHER PUBLICATIONS

Javed et al. A Study to Investigate the Impact of Requirements Instability on Software Defects, ACM Software Engineering Notes, May 2004, vol. 29 No. 4, pp. 1-7, Retrieved on [Jul. 8, 2013] Retrieved from the Internet: URL<http://dl.acm.org/citation.cfm?id=986727>.*

Gotterbarn et al. Responsible Risk Analysis for Software Development: Creating the Software Development Impact Statement, Communications of the Association for Information Systems (vol. 15, 2005) pp. 730-750, Retrieved on [Jul. 8, 2013] Retrieved from the Internet: URL<www.researchgate.net>.*

* cited by examiner

*Primary Examiner* — Thuy Dao
*Assistant Examiner* — Cheneca Smith

(57) ABSTRACT

An exemplary method includes displaying a graphical user interface configured to facilitate identification of one or more defects within a software instance, receiving data representative of at least one instruction via the graphical user interface to assign a severity risk value, an impact risk value, and a likelihood risk value to each of the one or more defects, and generating a defect risk factor corresponding to each of the one or more defects that indicates a risk level of each of the one or more defects, the generating based on a combination of the severity risk value, the impact risk value, and the likelihood risk value corresponding to each of the one or more defects.

18 Claims, 13 Drawing Sheets

Defect Identification

ID: D101

Title:

Description:

Severity Level: 1 (Showstopper)

Impact Level: 1 (Always)

Likelihood Level: 1 (Very Often)

Previous   Next

Fig. 6

Defect Severity Level Preferences

| Defect Severity Level | Description | Severity Risk Value | Options | |
|---|---|---|---|---|
| 1 | Showstopper | 5 | Edit | Delete |
| 2 | Critical | 4 | Edit | Delete |
| 3 | Major | 3 | Edit | Delete |
| 4 | Minor | 2 | Edit | Delete |
| 5 | Change Request | 1 | Edit | Delete |

Add

Fig. 7

Likelihood Level Preferences

| Likelihood Level | Description | Likelihood Risk Value | Options | |
|---|---|---|---|---|
| 1 | Always | 5 | Edit | Delete |
| 2 | Mostly | 4 | Edit | Delete |
| 3 | Sometimes | 3 | Edit | Delete |
| 4 | Less Likely | 2 | Edit | Delete |
| 5 | Rarely | 1 | Edit | Delete |

Add

Fig. 9

METHODS AND SYSTEMS OF DETERMINING RISK LEVELS OF ONE OR MORE SOFTWARE INSTANCE DEFECTS

BACKGROUND INFORMATION

Quality assurance is often an integral part of software development. For example, quality assurance personnel may test newly-developed software, identify defects contained within the software, and determine whether the software is of high enough quality to be released to end users.

Unfortunately, conventional quality assurance tools suffer from several shortcomings. For example, it is often difficult to prioritize the order in which identified defects are to be addressed (e.g., remedied) by software developers. Moreover, it is often difficult to objectively quantify the relative risk of addressing some defects over others.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 6 shows an exemplary graphical user interface ("GUI") configured to facilitate identification of one or more defects contained within a software instance and assignment of one or more risk values to each of the identified defects according to principles described herein.

FIG. 7 shows a GUI configured to facilitate modification of one or more severity risk values associated with one or more defect severity levels according to principles described herein.

FIG. 9 shows a GUI configured to facilitate modification of one or more likelihood risk values associated with one or more likelihood levels according to principles described herein.

DETAILED DESCRIPTION OF PREFERRED EMBODIMENTS

Figure 1:
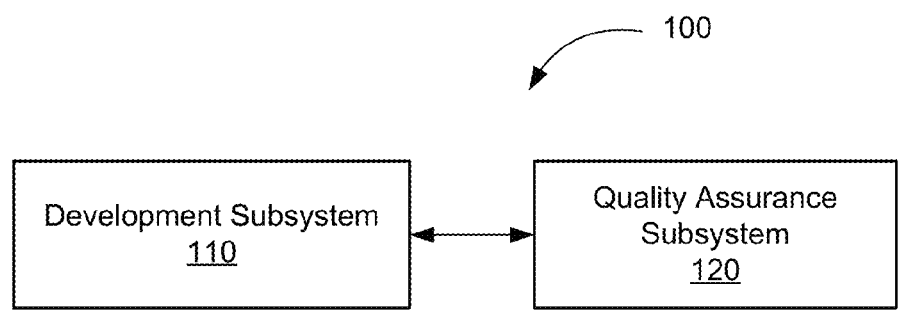
FIG. 1 illustrates an exemplary software development system according to principles described herein.

Methods and systems of determining a risk level of one or more defects within a software instance are described herein.

An exemplary method includes displaying a graphical user interface configured to facilitate identification of one or more defects within a software instance, receiving data representative of at least one instruction via the graphical user interface to assign a severity risk value, an impact risk value, and a likelihood risk value to each of the one or more defects, and generating a defect risk factor corresponding to each of the one or more defects that indicates a risk level of each of the one or more defects, the generating based on a combination of the severity risk value, the impact risk value, and the likelihood risk value corresponding to each of the one or more defects.

Another exemplary method includes receiving data representative of an identification of a plurality of defects within a software instance, receiving data representative of at least one instruction to assign a severity risk value, an impact risk value, and a likelihood risk value to each of the defects, generating a defect risk factor corresponding to each of the defects based on a combination of the severity risk value, the impact risk value, and the likelihood risk value for each of the defects, and determining an order in which the defects are addressed based on the defect risk factors corresponding to the defects.

An exemplary system includes a processing facility configured to direct a display to display a graphical user interface configured to facilitate identification of one or more defects in a software instance and a defect risk factor generation facility communicatively coupled to the processing facility. The defect risk factor generation facility is configured to assign a severity risk value, an impact risk value, and a likelihood risk value to each of the one or more defects in response to at least one instruction received via the graphical user interface and to generate a defect risk factor for each of the one or more defects that indicates a risk level of each of the one or more defects, the generation based on a combination of the severity risk value, the impact risk value, and the likelihood risk value corresponding to each of the one or more defects.

The methods and systems described herein may facilitate identification of one or more defects within a software instance and determination of a risk level for each of the one or more defects. As used herein, a "risk level" corresponding to a defect identified within a software instance is indicative of one or more risks associated with failure to address the defect. Such risks may include, but are not limited to, any potential negative effect to the performance, functionality, end user satisfaction, and/or any other feature of the software instance.

As used herein, "addressing" a defect identified within a software instance refers to any remedial action taken within respect to the defect. For example, one or more software developers may address a defect by fixing the defect, removing the defect from the software instance, lessening the severity of the defect, and/or by performing any other remedial action with respect to the defect as may serve a particular application.

FIG. 1 illustrates an exemplary software development system 100 (or simply "system 100"). As shown in FIG. 1, system 100 may include a development subsystem 110 and a quality assurance subsystem 120 configured to communicate with one another. As will be described in more detail below, development subsystem 110 may be configured to facilitate development of a software instance configured to be executed by one or more processing devices. Quality assurance subsystem 120 may be configured to facilitate identification of one or more defects within the software instance, assignment of one or more risk values to each of the one or more defects, and generation of one or more defect risk factors corresponding to each of the identified defects.

Development subsystem 110 and quality assurance subsystem 120 may communicate using any communication platforms and technologies suitable for transporting data, including known communication technologies, devices, media, and protocols supportive of remote or local data communications. Examples of such communication technologies, devices, media, and protocols include, but are not limited to, data transmission media, communications devices, Transmission Control Protocol ("TCP"), Internet Protocol ("IP"), File Transfer Protocol ("FTP"), Telnet, Hypertext Transfer Protocol ("HTTP"), Hypertext Transfer Protocol Secure ("HTTPS"), Session Initiation Protocol ("SIP"), Simple Object Access Protocol ("SOAP"), Extensible Markup Language ("XML") and variations thereof, Simple Mail Transfer Protocol ("SMTP"), Real-Time Transport Protocol ("RTP"), User Datagram Protocol ("UDP"), Global System for Mobile Communications ("GSM") technologies, Code Division Multiple Access ("CDMA") technologies, Time Division Multiple Access ("TDMA") technologies, Short Message Service ("SMS"), Multimedia Message Service ("MMS"), Evolution Data Optimized Protocol ("EVDO"), radio frequency ("RF") signaling technologies, signaling system seven ("SS7") technologies, Ethernet, in-band and out-of-band signaling technologies, Fiber-to-the-premises ("FTTP") technologies, Passive Optical Network ("PON") technologies, and other suitable communications networks and technologies.

In some examples, one or more components of system 100 may include any computer hardware and/or instructions (e.g., software programs including, but not limited to programming software (e.g., Microsoft Visual C, C++, Lua, HTML, Flash, OpenGL, etc.), simulation software, database software, web browsing software, etc.) or combinations of software and hardware, configured to perform one or more of the processes described herein. In particular, it should be understood that components of system 100 may be implemented on one physical computing device or may be implemented on more than one physical computing device. Accordingly, system 100 may include any one of a number of computing devices, and may employ any of a number of computer operating systems.

The processes described herein may be implemented at least in part as computer-executable instructions, i.e., instructions executable by one or more computing devices, tangibly embodied in a computer-readable medium. In general, a processor (e.g., a microprocessor) receives instructions from a computer-readable medium (e.g., a memory, etc.) and executes and/or directs execution of those instructions, thereby performing one or more processes, including one or more of the processes described herein. Such instructions may be stored and transmitted using a variety of known computer-readable media.

A computer-readable medium (also referred to as a processor-readable medium) includes any medium that participates in providing data (e.g., instructions) that may be read by a computer (e.g., by a processor of a computer). Such a medium may take many forms, including, but not limited to, non-volatile media and/or volatile media. Non-volatile media may include, for example, optical or magnetic disks and other persistent memory. Volatile media may include, for example, dynamic random access memory ("DRAM"), which typically constitutes a main memory. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

In some examples, development subsystem 110 and quality assurance subsystem 120 may communicate via one or more networks, including, but not limited to, wireless networks, broadband networks, closed media networks, cable networks, satellite networks, the Internet, intranets, local area networks, public networks, private networks, optical fiber networks, and/or any other networks capable of carrying data and communications signals between development subsystem 110 and quality assurance subsystem 120.

Figure 2:
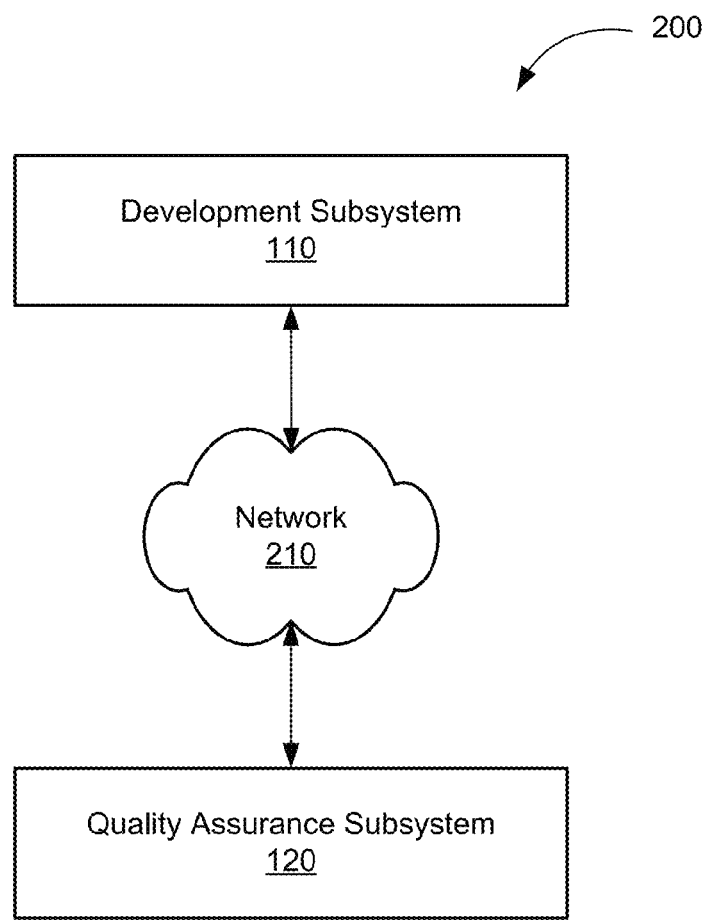
FIG. 2 shows an exemplary implementation of the system of FIG. 1 wherein a development subsystem and a quality assurance subsystem are communicatively coupled via a network according to principles described herein.

FIG. 2 shows an exemplary implementation 200 of system 100 wherein development subsystem 110 and quality assurance subsystem 120 are communicatively coupled via a network 210. Network 210 may include one or more networks, including, but not limited to, any of the networks listed above. Communications between development subsystem 110 and quality assurance subsystem 120 may be transported using any one of above-listed networks, or any combination or sub-combination of the above-listed networks. In some examples, development subsystem 110 and/or quality assurance subsystem 120 may be implemented at least in part on one or more servers or other network-enabled devices.

As mentioned, system 100 may be configured to facilitate development of one or more software instances configured to be executed by one or more processing devices. As used herein, a "processing device" may include, but is not limited to, a personal computing device (e.g., a desktop or laptop computer), a set-top box, a communication device (e.g., a phone device such as a Verizon Hub device), a media player, a wireless computing device, a wireless communication device (e.g., a mobile phone), a Global Positioning System ("GPS") device, a personal digital assistant, a content recording device (e.g., a camera, audio recorder, video camera), a television, a vehicular computing and/or communication device, a content-enabled device, a gaming device (e.g., a game console), and/or any other device configured to execute a software instance.

Figure 3:
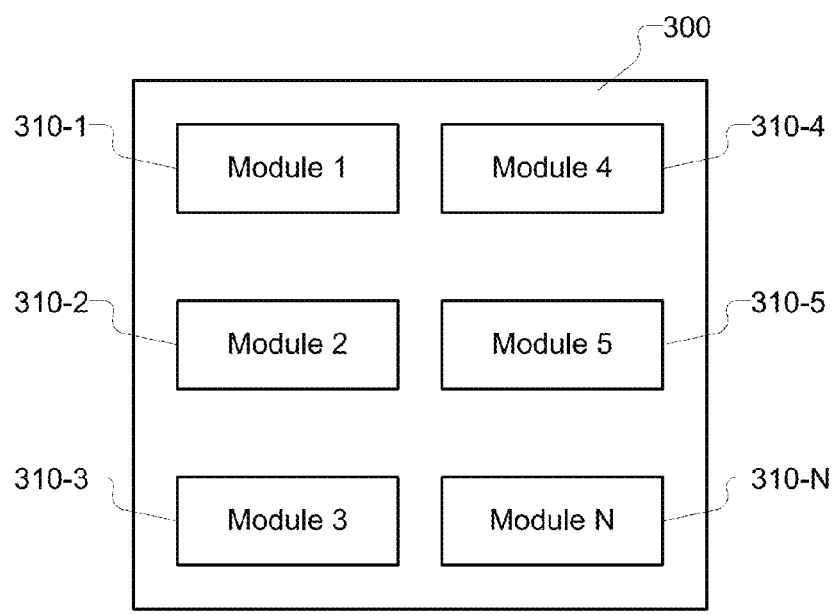
FIG. 3 illustrates an exemplary software product containing a plurality of modules according to principles described herein.

As used herein, the term "software instance" may refer to a software product (e.g., a software program or application), a module within a software product, and/or any other component of a software product as may serve a particular application. For example, FIG. 3 illustrates an exemplary software product 300 containing a plurality of modules 310-1 through 310-N (collectively referred to herein as "modules 310"). Any number of modules 310 may be included within software product 300 as may serve a particular application. Each module 310 may include a specific component, library, function, or other grouping of code within software product 300. Each module 310 may be configured to function independently of the other modules 310 or in conjunction with one or more other modules 310 as may serve a particular application.

Figure 4:
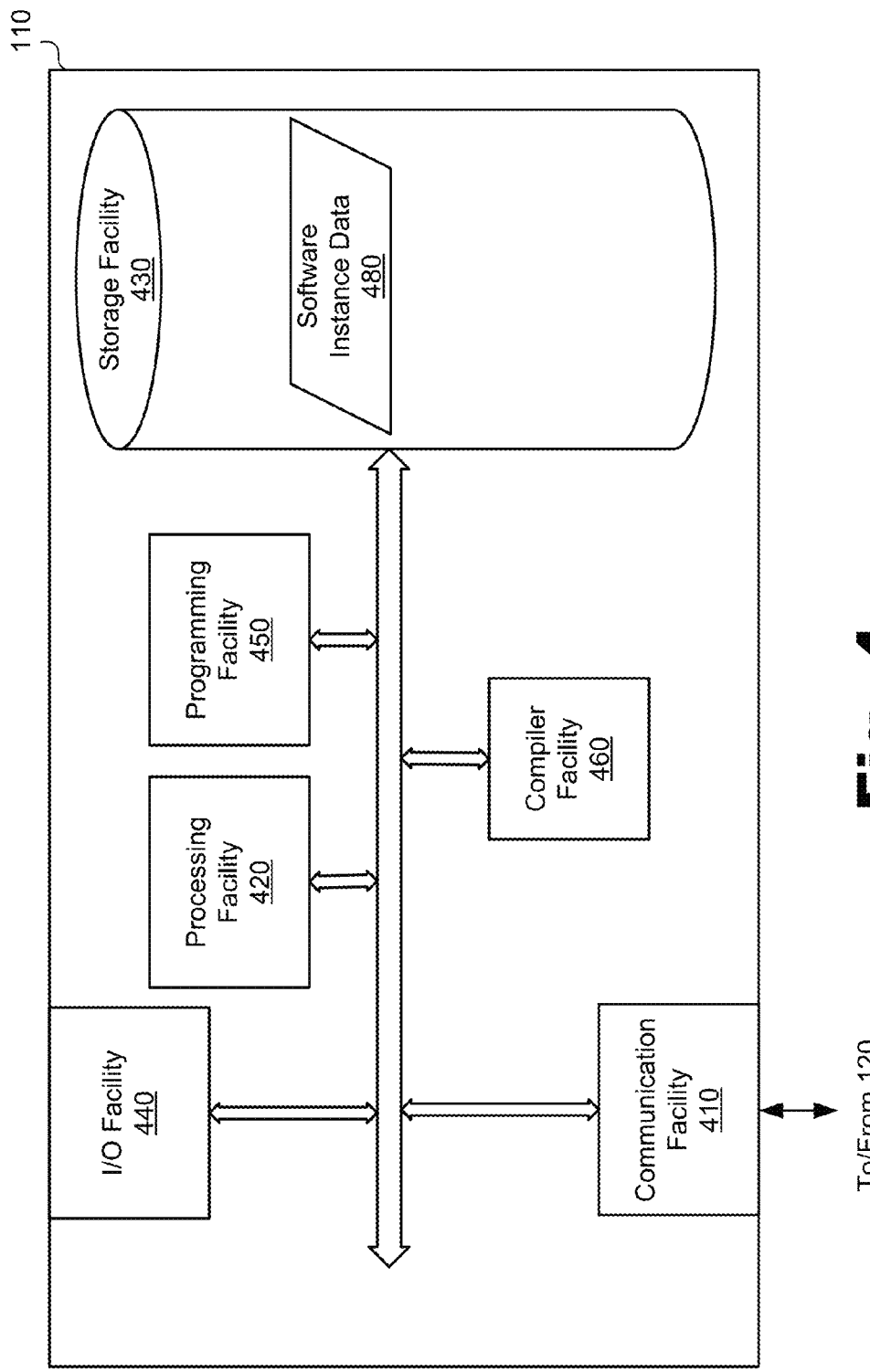
FIG. 4 illustrates components of an exemplary development subsystem according to principles described herein.

FIG. 4 illustrates components of an exemplary development subsystem 110. As shown in FIG. 4, development subsystem 110 may include a communication facility 410, a processing facility 420, a storage facility 430, an input/output ("I/O") facility 440, a programming facility 450, and a compiler facility 460 communicatively connected to one another. The facilities 410-460 may be communicatively connected using any suitable technologies. Each of the facilities 410-460 may be implemented as hardware, computing instructions (e.g., software) tangibly embodied on a computer-readable medium, or a combination of hardware and computing instructions configured to perform one or more of the processes described herein. In certain embodiments, for example, programming facility 450, compiler facility 460, and/or one or more other facilities may be implemented as one or more software applications embodied on a computer-readable medium such as storage facility 430 and configured to direct processing facility 420 of the development subsystem 110 and/or any other processing facility (e.g., a processing facility of quality assurance subsystem 120) to execute one or more of the processes described herein.

Communication facility 410 may be configured to communicate with quality assurance subsystem 120 (e.g., directly or over network 210), including sending and receiving data representative of a software instance, one or more defects within a software instance, and/or one or more defect severity levels associated with the defects to/from quality assurance subsystem 120. Communication facility 410 may include any device, logic, and/or other technologies suitable for transmitting and receiving such data. Communication facility 410 may be configured to interface with any suitable communication media, protocols, formats, platforms, and networks, including any of those mentioned herein.

Processing facility 420 may be configured to execute and/or direct execution of operations of one or more components of the development subsystem 110. Processing facility 420 may direct execution of operations in accordance with computer-executable instructions such as may be stored in storage facility 430 or another computer-readable medium.

Storage facility 430 may include one or more data storage media, devices, or configurations and may employ any type, form, and combination of storage media. For example, the storage facility 430 may include, but is not limited to, a hard drive, network drive, flash drive, magnetic disc, optical disc, random access memory ("RAM"), dynamic RAM ("DRAM"), other non-volatile and/or volatile storage unit, or a combination or sub-combination thereof. Data may be temporarily and/or permanently stored in the storage facility 430.

Different types of data, e.g., software instance data 480, may be maintained within storage facility 430. It will be recognized that data stored within storage facility 430 may additionally or alternatively be stored within any other storage medium as may serve a particular application.

Software instance data 480 may include any data associated with one or more software instances developed using development subsystem 110. For example, software instance data 480 may include source code created by a developer within any suitable programming language. Software instance data 480 may additionally or alternatively include compiled source code, documentation, and/or any other data as may serve a particular application.

I/O facility 440 may be configured to receive user input and provide user output and may include any hardware, firmware, software, or combination thereof supportive of input and output capabilities. For example, I/O facility 440 may include one or more devices for capturing or otherwise receiving user input, including, but not limited to, a keyboard or keypad, a touch screen component, a remote control, and/or receiver (e.g., an RF or infrared receiver).

I/O facility 440 may include one or more devices for presenting content for experiencing by a user, including, but not limited to, a graphics engine, a display, one or more display drivers, one or more audio speakers, and one or more audio drivers. Accordingly, I/O facility 440 may present content (e.g., display one or more graphical user interfaces ("GUIs")) for experiencing by the user.

Programming facility 450 may be configured to provide one or more tools for creating a software application. The tools may be configured to enable a developer to create, debug, format, modify, delete, annotate, access, retrieve, copy, move, send, request, receive, encrypt, decrypt, and/or otherwise manage software instance data and/or any other data as may serve a particular application. The tools may include or be provided using hardware, computer-readable instructions embodied on a computer-readable medium such as storage facility 430, or a combination of hardware and computer-readable instructions.

In some examples, the one or more tools provided by programming facility 450 may include one or more application clients configured to facilitate creation of source code that defines a software instance. Any suitable programming language may be used by programming facility 450 including, but not limited to, Microsoft Visual C, C++, Lua, HTML, Flash, and OpenGL.

Compiler facility 460 may be configured to perform one or more compiling operations on source code developed using programming facility 450. Compiler facility 460 may include hardware, computer-readable instructions embodied on a computer-readable medium such as storage facility 430 (e.g., one or more compiler engines), or a combination of hardware and computer-readable instructions. In certain embodiments, compiler facility 460 may be implemented as a software application embodied on a computer-readable medium such as storage facility 430 and configured to direct the processing facility 420 of the development subsystem 110 to execute one or more compilation operations described herein.

Figure 5:
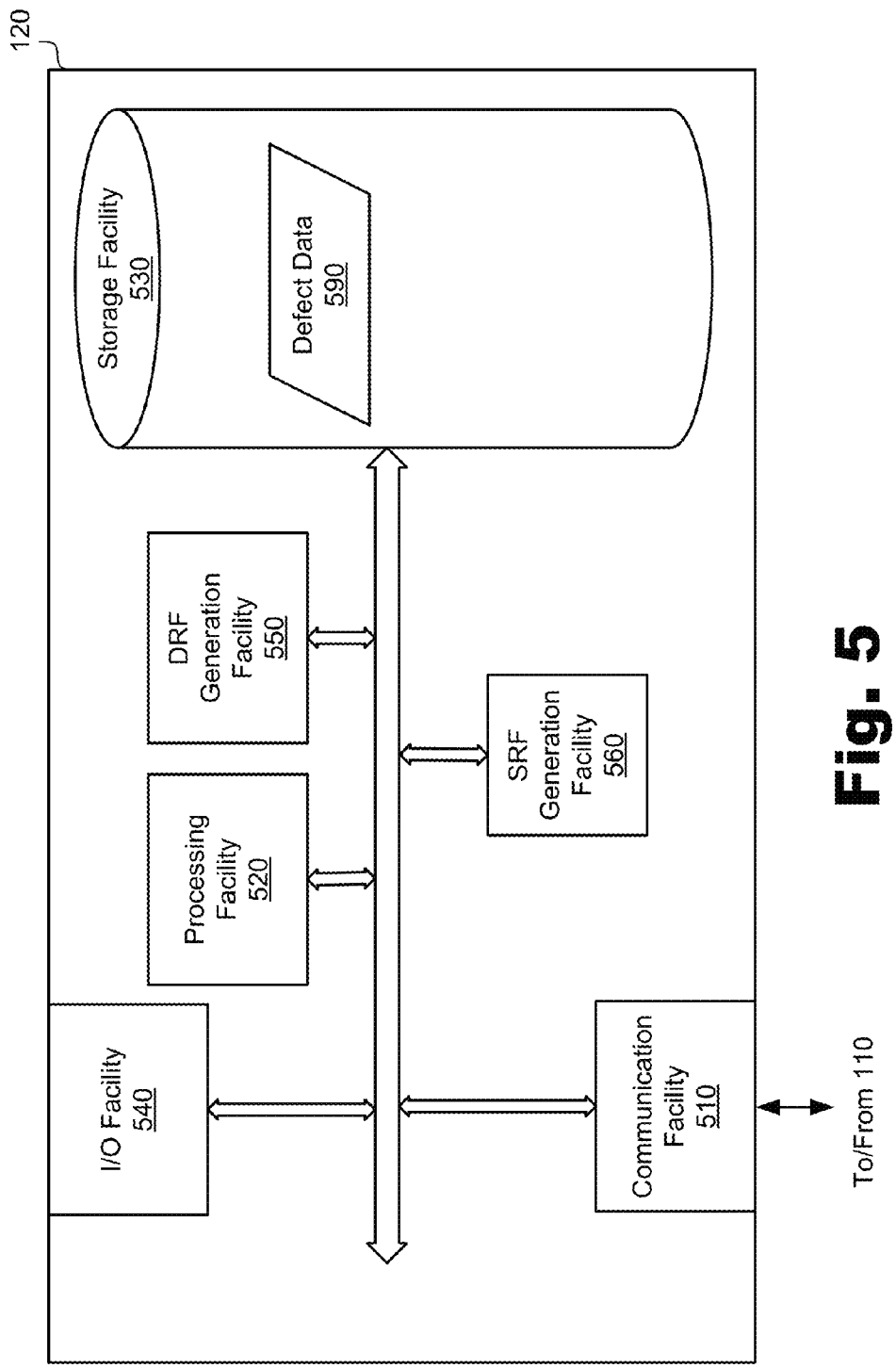
FIG. 5 illustrates components of an exemplary quality assurance subsystem according to principles described herein.

FIG. 5 illustrates components of an exemplary quality assurance subsystem 120. As shown in FIG. 5, quality assurance subsystem 120 may include a communication facility 510, a processing facility 520, a storage facility 530, an input/output ("I/O") facility 540, a defect risk factor ("DRF") generation facility 550, and a software risk factor ("SRF") generation facility 560 communicatively connected to one another. The facilities 510-560 may be communicatively connected using any suitable technologies. Each of the facilities 510-560 may be implemented as hardware, computing instructions (e.g., software) tangibly embodied on a computer-readable medium, or a combination of hardware and computing instructions configured to perform one or more of the processes described herein. In certain embodiments, for example, DRF generation facility 550, SRF generation facility 560, and/or one or more other facilities may be implemented as one or more software applications embodied on a computer-readable medium such as storage facility 530 and configured to direct processing facility 520 of the quality assurance subsystem 120 and/or any other processing facility (e.g., of development subsystem 110) to execute one or more of the processes described herein.

Communication facility 510 may be configured to communicate with development subsystem 110 (e.g., directly or over network 210), including sending and/or receiving data representative of a software instance, one or more defects within a software instance, one or more defect severity levels associated with the defects, and/or other communications to/from development subsystem 110. Communication facility 510 may include any device, logic, and/or other technologies suitable for transmitting and receiving such data. Communication facility 510 may be configured to interface with any suitable communication media, protocols, formats, platforms, and networks, including any of those mentioned herein.

Processing facility 520 may be configured to execute and/or direct execution of operations of one or more components of the quality assurance subsystem 120. Processing facility 520 may direct execution of operations in accordance with computer-executable instructions such as may be stored in storage facility 530 or another computer-readable medium.

Storage facility 530 may include one or more data storage media, devices, or configurations and may employ any type, form, and combination of storage media. For example, the storage facility 530 may include, but is not limited to, a hard drive, network drive, flash drive, magnetic disc, optical disc, RAM, DRAM, other non-volatile and/or volatile storage unit, or a combination or sub-combination thereof. Data may be temporarily and/or permanently stored in the storage facility 530.

Different types of data may be maintained within storage facility 530. For example, as shown in FIG. 5, defect data 590 may be maintained within storage facility 530. It will be recognized that data stored within storage facility 530 may additionally or alternatively be stored within any other storage medium as may serve a particular application.

Defect data 590 may include any data descriptive of or otherwise associated with one or more defects identified within a software instance. For example, defect data 590 may include descriptions of one or more defects within a software instance, identification numbers associated with the one or more defects, data representative of one or more risk values associated with the identified defects, and/or any other data associated with the one or more defects as may serve a particular application.

I/O facility 540 may be configured to receive user input and provide user output and may include any hardware, firmware, software, or combination thereof supportive of input and output capabilities. For example, I/O facility 540 may include one or more devices for capturing or otherwise receiving user input, including, but not limited to, a keyboard or keypad, a mouse, a microphone, a touch screen component, a remote control, and/or a receiver (e.g., an RF or infrared receiver). Accordingly, a user may input one or more instructions or commands to quality assurance subsystem 120 to identify one or more defects within a software instance and/or assign one or more risk values to one or more of the identified defects.

I/O facility 540 may include one or more devices for presenting content for experiencing by a user, including, but not limited to, a graphics engine, a display, one or more display drivers, one or more audio speakers, and one or more audio drivers. Accordingly, I/O facility 540 may present content (e.g., display one or more GUIs configured to facilitate identification of one or more defects in a software instance) for experiencing by the user.

DRF generation facility 550 may be configured to generate a defect risk factor corresponding to a defect included within a software instance. A "defect risk factor" corresponding to a defect within a software instance may be configured to indicate a level of risk associated with failing to address the defect. In some examples, defect risk factors associated with a plurality of defects may be compared one to another to determine relative risk levels associated with each of the defects. Defect risk factors will be described in more detail below.

SRF generation facility 560 may be configured to generate a software risk factor corresponding to a software instance. A "software risk factor" may be configured to indicate an overall risk level associated with failing to address the defects identified within a software instance. Risks associated with failing to address the defects identified within a software instance may include, but are not limited to, any potential negative effect to the performance, functionality, end user satisfaction, and/or any other feature of the software instance. In some examples, software risk factors associated with a plurality of software instances (e.g., modules within a software product) may be compared one to another to determine relative risk levels associated with each of the software instances. Software risk factors will be described in more detail below.

Various features, embodiments, and applications of system 100 will now be described. It will be recognized that the features, embodiments, and applications described herein are merely illustrative, and that system 100 may be configured to perform additional or alternative functions as may serve a particular application.

In some examples, quality assurance subsystem 120 may be configured to generate and display one or more GUIs configured to facilitate identification of one or more defects contained within a software instance. The one or more GUIs may be further configured to facilitate assignment of one or more risk values to each of the identified defects. As will be described in more detail below, identification of such defects and assignment of the one or more risk values thereto may facilitate generation of one or more defect risk factors and/or software risk factors described herein.

To illustrate, FIG. 6 shows an exemplary GUI 600 configured to facilitate identification of one or more defects contained within a software instance and assignment of one or more risk values to each of the identified defects. GUI 600 may be utilized by a user of quality assurance subsystem 120 (e.g., quality assurance personnel) or any other user as may serve a particular application. It will be recognized that GUI 600 is merely illustrative of the many different GUIs that may be used to facilitate identification of one or more defects within a software instance and association of one or more risk values with each of the identified defects. Moreover, it will be recognized that the one or more defects may alternatively be identified by one or more end users of the software instance, one or more processing devices, and/or any other user or device as may serve a particular application.

As shown in FIG. 6, various types of information associated with an identified defect may be recorded using GUI 600. For example, an identification number corresponding to the identified defect may be input into field 610. The identification number may be alternatively generated automatically and pre-populated within field 610 by quality assurance subsystem 120. Additionally or alternatively, a title corresponding to the identified defect may be input into field 620 and a description of the identified defect may be input into field 630. Any other type of information may additionally or alternatively be input into one or more other fields as may serve a particular application.

In some examples, a user may utilize GUI 600 to assign one or more risk values to each defect identified within a software instance in order to facilitate generation of a defect risk factor for each of the identified defects. As will be described in more detail below, a defect risk factor corresponding to a defect may be generated based on a combination of the one or more risk values assigned to the defect.

As used herein, "risk values" are numerical weighting values that may be assigned to one or more "risk attributes". Each risk attribute is a component of (i.e., contributes to) an overall risk level associated with a defect and indicates a particular type of risk associated with the defect. For example, a "severity risk attribute", an "impact risk attribute", and a "likelihood risk attribute" may each be a component of an overall risk level associated with a defect and indicate particular types of risks associated with the defect. In this example, a risk value assigned to a severity risk attribute may be referred to as a "severity risk value", a risk value assigned to an impact risk attribute may be referred to as an "impact risk value", and a risk value assigned to a likelihood risk attribute may be referred to as a "likelihood risk value".

In some examples, a severity risk attribute corresponding to a defect is configured to indicate a relative severity or seriousness of the defect and how the defect may affect functionality and/or performance of the software instance as a whole. It will be recognized that some identified defects may be more severe than others. For example, a defect that causes a software instance to crash may warrant immediate attention by software developers while a defect that results in a minor glitch may be less of a priority for software developers to address. Hence, the severity risk attribute may include a plurality of pre-defined defect severity levels each associated with a particular severity risk value. A user may assign a particular severity risk value to an identified defect by selecting one of the pre-defined defect severity levels to be associated with the defect.

For example, Table 1 lists five exemplary defect severity levels and their corresponding severity risk values that may be defined and used in accordance with the systems and methods described herein.

TABLE 1

| Defect Severity Level | Description | Severity Risk Value |
|---|---|---|
| 1 | Showstopper | 5 |
| 2 | Critical | 4 |
| 3 | Major | 3 |
| 4 | Minor | 2 |
| 5 | Change Request | 1 |

As shown in Table 1, a first defect severity level may describe defects within a software instance that are deemed "showstoppers". These defects may be so severe that the software instance cannot function or be released to end users without the defects being addressed. A second defect severity level may describe defects that are deemed "critical". These defects are slightly less severe than showstopper defects, but still warrant immediate attention by software developers. A third defect severity level may describe defects that are deemed "major". These defects are less severe than critical defects, but may still affect the functionality and/or performance of the software instance in a relatively major way. A fourth defect severity level may describe defects that are deemed "minor". These defects may affect the functionality and/or performance of the software instance, albeit in a relatively minor way. A fifth defect severity level may describe defects that do not affect the functionality and/or performance of the software instance, but they may be addressed to improve one or more inconsequential aspects of the software instance.

It will be recognized that the defect severity levels shown in Table 1 are merely illustrative of the many different defect severity levels and/or sets of defect severity levels that may be specified by a user of quality assurance subsystem 120. In some examples, a user of quality assurance subsystem 120 may modify the descriptions associated with one or more of the defect severity levels shown in Table 1. Additionally or alternatively, a user may add or remove any number of defect severity levels that may be associated with an identified defect as may serve a particular application.

As shown in Table 1, each defect severity level may have a corresponding severity risk value assigned thereto. The severity risk values are configured to weight each defect severity level according to its relative severity. For example, the first defect severity level may have a severity risk value of "5," the second defect severity level may have a severity risk value of "4," the third defect severity level may have a severity risk value of "3," the fourth defect severity level may have a severity risk value of "2," and the fifth defect severity level may have a severity risk value of "1."

It will be recognized that the severity risk values shown in Table 1 are merely illustrative of the many different severity risk values and combinations of severity risk values that may be assigned to the defect severity levels in accordance with the systems and methods described herein. In some examples, a user may manually adjust a relationship between one or more of the severity risk values and one or more of the defect severity levels as may serve a particular application.

In some examples, DRF generation facility 550 and/or any other facility within quality assurance subsystem 120 may be configured to receive via GUI 600 data representative of at least one instruction to associate a defect severity level with each defect identified within a software instance and thereby assign a severity risk value to each identified defect. For example, as shown in FIG. 6, a defect severity level may be associated with an identified defect by selecting an option from a drop-down menu 640, which menu 640 may include a plurality of selectable options corresponding to a set of defect severity levels. It will be recognized that a defect severity level may be associated with an identified defect in any other manner as may serve a particular application.

In some examples, an impact risk attribute corresponding to a defect is configured to indicate an impact that the defect may have on an end user of the software instance. For example, a defect may have a relatively high impact on an end user if the defect causes substantial end user dissatisfaction with the software instance. Conversely, a defect may have a relatively low impact on an end user if the defect does not affect end user satisfaction in any noticeable way. As used herein, an "end user" of a software instance refers to any customer or other user of the software instance not associated directly with the processes performed by users of quality assurance subsystem 120.

It is often desirable to address defects that have a relatively high potential impact on end users before addressing defects that have a relatively low potential impact on end users. To this end, the impact risk attribute may include a plurality of pre-defined impact levels each associated with a particular impact risk value. A user may assign a particular impact risk value to an identified defect by selecting one of the pre-defined impact levels to be associated with the defect.

For example, Table 2 lists five exemplary impact levels and their corresponding impact risk values that may be defined and used in accordance with the systems and methods described herein.

TABLE 2

| Impact level | Description | Impact Risk Value |
|---|---|---|
| 1 | Very High | 5 |
| 2 | High | 4 |
| 3 | Medium | 3 |
| 4 | Low | 2 |
| 5 | Very Low | 1 |

As shown in Table 2, the first impact level may describe defects within a software instance that are deemed to have a "very high" impact level. These defects are certain to cause substantial end user dissatisfaction with the software instance. A second impact level may describe defects deemed to have a "high" impact level. These defects may have slightly less of an impact on an end user than the first impact level, but still warrant immediate attention by software developers. The third impact level may describe defects deemed to have a "medium" impact level. These defects may have some impact on an end user, but may only cause a medium level of customer dissatisfaction. The fourth impact level may describe defects deemed to have a "low" impact level. These defects may impact an end user in a relatively minor way. The fifth impact level may describe defects deemed to have a "very low" impact level. These defects may only slightly impact an end user, and in some instances may not have a noticeable effect on end user satisfaction with the software instance.

It will be recognized that the impact levels shown in Table 2 are merely illustrative of the many different impact levels that may be specified by a user of quality assurance subsystem 120. In some examples, a user of quality assurance subsystem 120 may modify the descriptions associated with one or more of the impact levels shown in Table 2. Additionally or alternatively, a user may add or remove any number of impact levels that may be associated with an identified defect as may serve a particular application.

As shown in Table 2, each impact level may have a corresponding impact risk value assigned thereto. The impact risk values are configured to weight each impact level according to its relative impact on an end user. For example, the first impact level may have an impact risk value of "5," the second impact level may have an impact risk value of "4," the third impact level may have an impact risk value of "3," the fourth impact level may have an impact risk value of "2," and the fifth impact level may have an impact risk value of "1."

It will be recognized that the impact risk values shown in Table 2 are merely illustrative of the many different impact risk values and combinations of impact risk values that may be assigned to the impact levels in accordance with the systems and methods described herein. In some examples, a user may manually adjust a relationship between one or more of the impact risk values and one or more of the impact levels as may serve a particular application.

In some examples, DRF generation facility 550 and/or any other facility within quality assurance subsystem 120 may be configured to receive via GUI 600 data representative of at least one instruction to associate an impact level with each identified defect and thereby assign an impact risk value to each identified defect. For example, as shown in FIG. 6, an impact level may be associated with an identified defect by selecting an option from a drop-down menu 650, which menu 650 may include a plurality of selectable options corresponding to a set of impact levels. It will be recognized that an impact level may be associated with an identified defect in any other manner as may serve a particular application.

In some examples, a likelihood risk attribute corresponding to a defect is configured to indicate a likelihood of "defect occurrence." As used herein, a likelihood of "defect occurrence" refers to a probability that the defect will cause the software instance to malfunction or otherwise negatively perform for an end user. It will be recognized that some defects may only cause performance issues for a software instance in certain instances or configurations. For example, a defect affecting the performance of a particular module within a software product may not affect the performance of the software product as a whole in instances where the affected module is not used. To illustrate, a defect may affect the ability of a software product to perform a print command. The likelihood of this defect affecting the performance of the software product depends on the number of times that the end user utilizes the print command.

It is often desirable to address defects that have a relatively high likelihood of occurrence before addressing defects that have a relatively low likelihood of occurrence. To this end, the likelihood risk attribute may include a plurality of pre-defined likelihood levels each associated with a particular likelihood risk value. A user may assign a particular likelihood risk value to an identified defect by selecting one of the pre-defined likelihood levels to be associated with the defect.

For example, Table 3 lists five exemplary likelihood levels and their corresponding likelihood risk values that may be defined and used in accordance with the systems and methods described herein.

TABLE 3

| Likelihood level | Description | Likelihood Risk Value |
| --- | --- | --- |
| 1 | Always | 5 |
| 2 | Mostly | 4 |
| 3 | Sometimes | 3 |
| 4 | Less Likely | 2 |
| 5 | Rarely | 1 |

As shown in Table 3, the first likelihood level may describe defects within a software instance that are deemed to have a likelihood of always occurring. These defects are certain to cause the software instance to malfunction or otherwise negatively perform for an end user. The second likelihood level may describe defects deemed to have a likelihood of mostly occurring. These defects usually cause the software instance to malfunction or otherwise negatively perform for an end user. The third likelihood level may describe defects deemed to have a likelihood of sometimes occurring. These defects sometimes cause the software instance to malfunction or otherwise negatively perform for an end user. The fourth likelihood level may describe defects deemed less likely to occur. These defects are relatively less likely to cause the software instance to malfunction or otherwise negatively perform for an end user. The fifth likelihood level may describe defects deemed to rarely occur. These defects rarely cause the software instance to malfunction or otherwise negatively perform for an end user.

It will be recognized that the likelihood levels shown in Table 3 are merely illustrative of the many different likelihood levels that may be specified by a user of quality assurance subsystem 120. In some examples, a user of quality assurance subsystem 120 may modify the descriptions associated with one or more of the likelihood levels shown in Table 3. Additionally or alternatively, a user may add or remove any number of likelihood levels that may be associated with an identified defect as may serve a particular application.

As shown in Table 3, each likelihood level may have a corresponding likelihood risk value assigned thereto. The likelihood risk values are configured to weight each likelihood level according to its relative likelihood of occurring. For example, the first likelihood level may have a likelihood risk value of "5," the second likelihood level may have a likelihood risk value of "4," the third likelihood level may have a likelihood risk value of "3," the fourth likelihood level may have a likelihood risk value of "2," and the fifth likelihood level may have a likelihood risk value of "1."

It will be recognized that the likelihood risk values shown in Table 3 are merely illustrative of the many different likelihood risk values and combinations of likelihood risk values that may be assigned to the likelihood levels in accordance with the systems and methods described herein. In some examples, a user may manually adjust a relationship between one or more of the likelihood risk values and one or more of the likelihood levels as may serve a particular application.

In some examples, DRF generation facility 550 and/or any other facility within quality assurance subsystem 120 may be configured to receive via GUI 600 data representative of at least one instruction to associate a likelihood level with each identified defect and thereby assign a likelihood risk value to each identified defect. For example, as shown in FIG. 6, a likelihood level may be associated with an identified defect by selecting an option from a drop-down menu 660, which menu 660 may include a plurality of selectable options corresponding to a set of likelihood levels. It will be recognized that a likelihood level may be associated with an identified defect in any other manner as may serve a particular application.

As shown in FIG. 6, a user may select one of navigation buttons 670 and 680 to navigate between viewing screens respectively associated with various identified defects. For example, after a particular defect has been identified, the user may select button 680 in GUI 600 to navigate to another viewing screen wherein the user may input information describing another defect.

As mentioned, a user may manually adjust one or more of the severity risk values, impact risk values, and/or likelihood risk values described herein. For example, FIG. 7 shows a GUI 700 configured to facilitate manual modification of one or more severity risk values associated with one or more defect severity levels. As shown in FIG. 7, a number of options 710 may be associated with each defect severity level. One of the options 710 may include an option to edit one or more properties associated with a defect severity level. For example a user may utilize GUI 700 to modify a description, a severity risk value, and/or any other property associated with a particular defect severity level. In some examples, GUI 700 may additionally or alternatively be used to add or remove one or more defect severity levels to the group of selectable defect severity levels.

Figure 8:
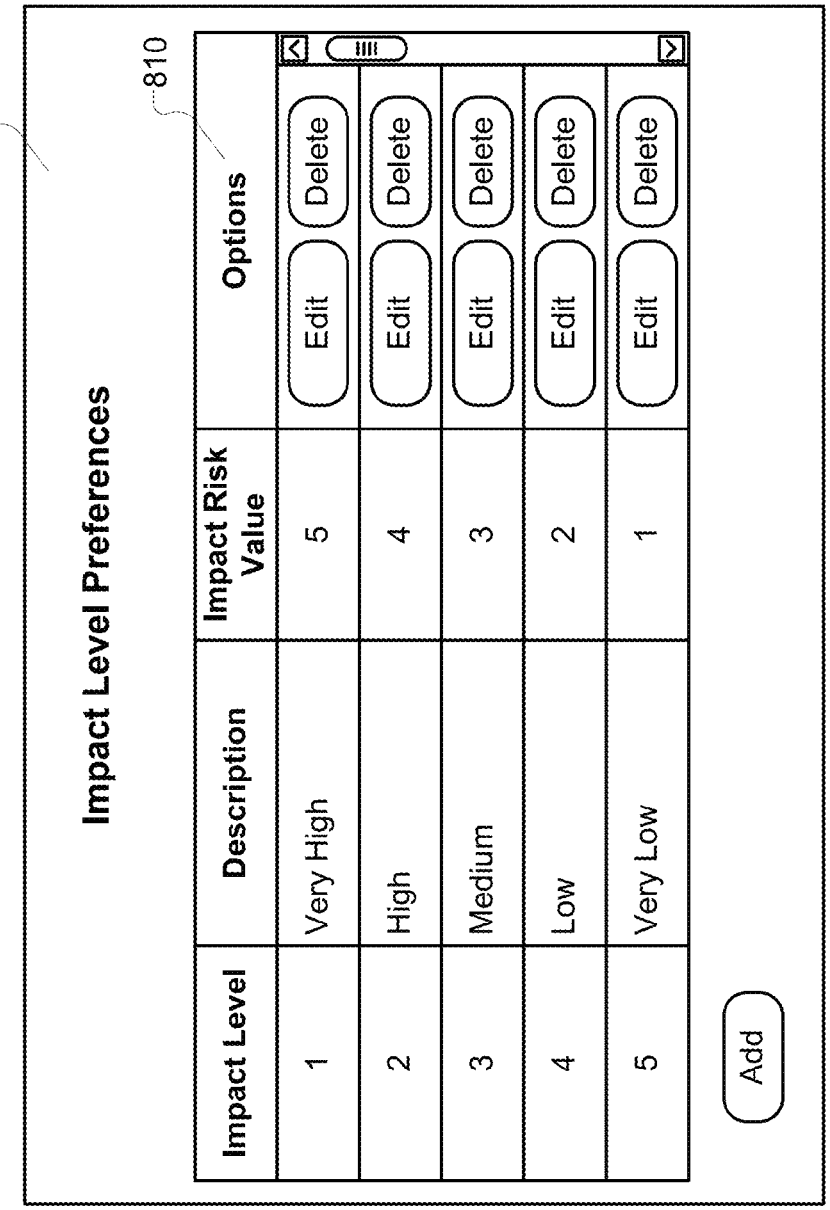
FIG. 8 shows a GUI configured to facilitate modification of one or more impact risk values associated with one or more impact levels according to principles described herein.

FIG. 8 shows a GUI 800 configured to facilitate manual modification of one or more impact risk values associated with one or more impact levels. As shown in FIG. 8, a number of options 810 may be associated with each impact level. One of the options 810 may include an option to edit one or more properties associated with an impact level. For example a user may utilize GUI 800 to modify a description, an impact risk value, and/or any other property associated with a particular impact level. In some examples, GUI 800 may additionally or alternatively be used to add or remove one or more impact levels to the group of selectable impact levels.

FIG. 9 shows a GUI 900 configured to facilitate manual modification of one or more likelihood risk values associated with one or more likelihood levels. As shown in FIG. 9, a number of options 910 may be associated with each likelihood level. One of the options 910 may include an option to edit one or more properties associated with a likelihood level. For example a user may utilize GUI 900 to modify a description, a likelihood risk value, and/or any other property associated with a particular likelihood level. In some examples, GUI 900 may additionally or alternatively be used to add or remove one or more likelihood levels to the group of selectable likelihood levels.

In some examples, the severity risk values, impact risk values, and likelihood risk values assigned to the identified defects within a software instance may be used by DRF generation facility 550 to generate a defect risk factor corresponding to each defect. An exemplary method or heuristic that may be used to generate a defect risk factor corresponding to a defect identified within a software instance will now be described.

In some examples, a defect risk factor corresponding to a defect identified within a software instance may be generated by DRF generation facility 550 in accordance with Equation 1:

$$DRF=SRV+IRV+LRV \qquad \text{(Equation 1)}$$

In the above equation, "SRV" represents a severity risk value assigned to the defect, "IRV" represents an impact risk value assigned to the defect, and "LRV" represents a likelihood risk value assigned to the defect. Hence, a defect risk value for a defect may be generated by summing the individual risk values assigned to the defect.

For example, five defect severity levels may be defined each having one of the severity risk values shown in Table 1, five impact levels may be defined each having one of the impact risk values shown in Table 2, and five likelihood levels may be defined each having one of the likelihood risk values shown in Table 3. A user of quality assurance subsystem 120 may identify a defect and assign the defect a severity risk value of "4," an impact risk value of "3," and a likelihood risk value of "5." Therefore, the defect risk factor associated with the defect is equal to 4+3+5, which equals 12.

Once generated, a defect risk factor corresponding to a particular defect identified within a software instance may be compared to defect risk factors corresponding to other defects within the software instance to determine an order in which the defects are addressed. It will be recognized that in some instances, it may not be feasible to address each of the defects identified in a software instance. For example, software release deadlines, budget limitations, and/or other restraints may necessitate addressing some defects over others. A comparison of defect risk factors associated with defects contained within a software instance may objectively quantify the relative risk of addressing some of the defects over others.

To illustrate, Table 4 shows exemplary defect risk factor data corresponding to a plurality of defects identified within a particular software instance.

TABLE 4

| Defect Number | Severity Risk Value | Impact Risk Value | Likelihood Risk Value | DRF |
| --- | --- | --- | --- | --- |
| 1 | 5 | 5 | 4 | 14 |
| 2 | 3 | 2 | 4 | 9 |
| 3 | 4 | 3 | 2 | 9 |
| 4 | 1 | 1 | 2 | 4 |

As shown in Table 4, each defect may have a severity risk value, impact risk value, and likelihood risk value assigned thereto. For example, the first defect has a severity risk value equal to "5," an impact risk value equal to "5," and a likelihood risk value equal to "4." Thus, the defect risk factor associated with the first defect is equal to "14," as shown in Table 4. Risk values and defect risk factors corresponding to three other defects are also shown in Table 4 for illustrative purposes only. It will be recognized that the risk values corresponding to each defect may vary as may serve a particular application and that they may be assigned to each defect in any suitable manner (e.g., via GUI 600 shown in FIG. 6).

Figure 10:
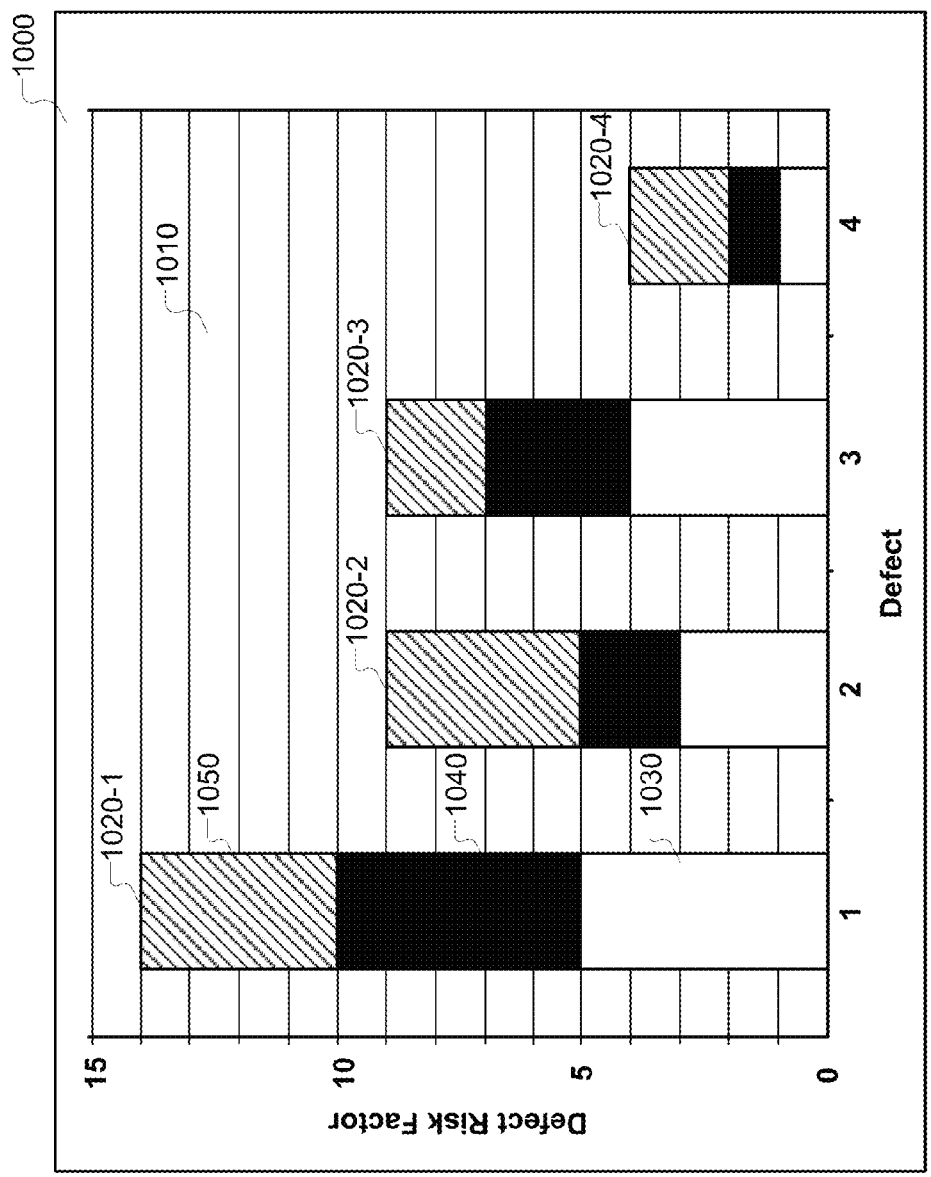
FIG. 10 illustrates a GUI configured to graphically depict a comparison of defect risk factors according to principles described herein.

FIG. 10 illustrates a GUI 1000 that may be generated and displayed by DRF generation facility 550 and that is configured to graphically depict a comparison of the defect risk factors listed in Table 4. As shown in FIG. 10, GUI 1000 may include a bar graph 1010 configured to graphically represent the defect risk factor data shown in Table 4. For example, bar 1020-1 shows that the first defect has a defect risk factor of "14," bar 1020-2 shows that the second defect has a defect risk factor of "9," bar 1020-3 shows that the third defect has a defect risk factor of "9," and bar 1020-4 shows that the fourth defect has a defect risk factor of "4." Bars 1020-1 through 1020-4 will be collectively referred to herein as "bars 1020".

As shown in FIG. 10, each bar 1020 may also graphically represent the specific severity risk values, impact risk values, and likelihood risk values associated with each defect. For example, a non-filled portion (e.g., portion 1030) of each bar 1020 represents the severity risk value associated with each defect, a filled portion (e.g., portion 1040) of each bar 1020 represents the impact risk value associated with each defect, and a portion having a hatch pattern (e.g., portion 1050) of each bar 1020 represents the likelihood risk value associated with each defect.

By viewing graph 1010, a user may visually compare defect risk factors associated with each defect identified within a software instance. For example, by viewing graph 1010, a user may readily recognize that the first defect has the highest defect risk factor and that the fourth defect has the lowest defect risk factor.

In some examples, the order in which the defects are addressed may be based on a descending order of the defect risk factors corresponding to each of the defects. For example, the first defect shown in FIG. 10 may be addressed first because it has the highest defect risk factor and the fourth defect may be addressed last because it has the lowest defect risk factor. It will be recognized that the order in which the defects are addressed may be determined in accordance with any other factor or heuristic as may serve a particular application.

In some instances, multiple defects within a software instance may have identical defect risk factors. In such instances, DRF generation facility 550 may be configured to base the order in which the defects are addressed on the individual risk values assigned to the defects. For example, the order in which defects having identical defect risk factors are addressed may be first based on the severity risk values assigned to the defects, then on the impact risk values assigned to the defects, and then on the likelihood risk values assigned to the defects.

To illustrate, the second and third defects listed in Table 4 and shown in FIG. 10 each have a defect risk factor equal to "9." However, the third defect has a higher severity risk value than the second defect ("4" versus "3"). Hence, DRF generation facility 550 may determine that the third defect is to be addressed before the second defect.

It will be recognized that the order in which defects having identical defect risk factors are addressed may be based on any of the risk values described herein and/or on any other factor. For example, the order may be based on a combination of risk values (e.g., a combination of severity risk values and impact risk values), an association between defects (e.g., if two or more defects are related one to another, each of the related defects may be addressed concurrently), and/or any other factor as may serve a particular application.

In some examples, the defect risk factors generated by DRF generation facility 550 and associated with the identified defects within a software instance may additionally or alternatively be used by SRF generation facility 560 to generate a software risk factor corresponding to the software instance. As mentioned, the software risk factor may be configured to indicate an overall risk level associated with failing to address the defects identified within the software instance.

In some examples, a software risk factor corresponding to a software instance may be generated by SRF generation facility 560 in accordance with Equation 2:

$$SRF = \sum_{i=1}^{n} DRF_i \quad \text{(Equation 2)}$$

In Equation 2, $DRF_i$ represents a defect risk factor associated with a particular defect and n represents the total number of defects identified within a software instance. Hence, the software risk factor corresponding to a software instance may be generated by summing the defect risk factors associated with all of the defects identified within the software instance.

For example, the four defects listed in Table 4 may be identified within a particular software instance. The software risk factor corresponding to the software instance is therefore equal to 14+9+9+4, which equals 36.

Once generated, a software risk factor corresponding to a particular software instance may be compared to software risk factors corresponding to other software instances to determine relative risk levels associated with each of the software instances. For example, a software risk factor may be generated for each module within a software product. The software risk factors corresponding to each module may be compared one to another to determine which module is most likely to cause the software instance to malfunction or otherwise negatively perform. The software risk factors may additionally or alternatively be used to determine an order in which the modules are addressed.

To illustrate, Table 5 shows exemplary software risk factor data corresponding to a plurality of modules within an exemplary software product.

TABLE 5

| Module Number | Defect Number | SRV | IRV | LRV | DRF |
|---|---|---|---|---|---|
| 1 | 1 | 5 | 5 | 4 | 14 |
| 1 | 2 | 3 | 2 | 4 | 9 |
| | | Module 1 SRF | | | 23 |
| 2 | 3 | 4 | 3 | 2 | 9 |
| 2 | 4 | 1 | 1 | 2 | 4 |
| | | Module 2 SRF | | | 13 |

As shown in Table 5, two defects have been identified in a first module of the exemplary software product and two defects have been identified in a second module of the exemplary software product. As shown in Table 5, each defect may have a severity risk value, impact risk value, and likelihood risk value assigned thereto. For example, the first defect has a severity risk value equal to "5," an impact risk value equal to "5," and a likelihood risk value equal to "4." Thus, the defect risk factor associated with the first defect is equal to "14," as shown in Table 5. Risk values and defect risk factors corresponding to the other three defects are also shown in Table 5.

Software risk values corresponding to each module are also shown in Table 5. For example, Table 5 shows that the first module has a software risk value of "23." This value may be generated in accordance with Equation 2 above and is based on the defect risk factors corresponding to the defects identified within the first module. Likewise, Table 5 shows that the second module has a software risk value of "13." This value may be generated in accordance with Equation 2 above and is based on the defect risk factors corresponding to the defects identified within the second module.

Figure 11:
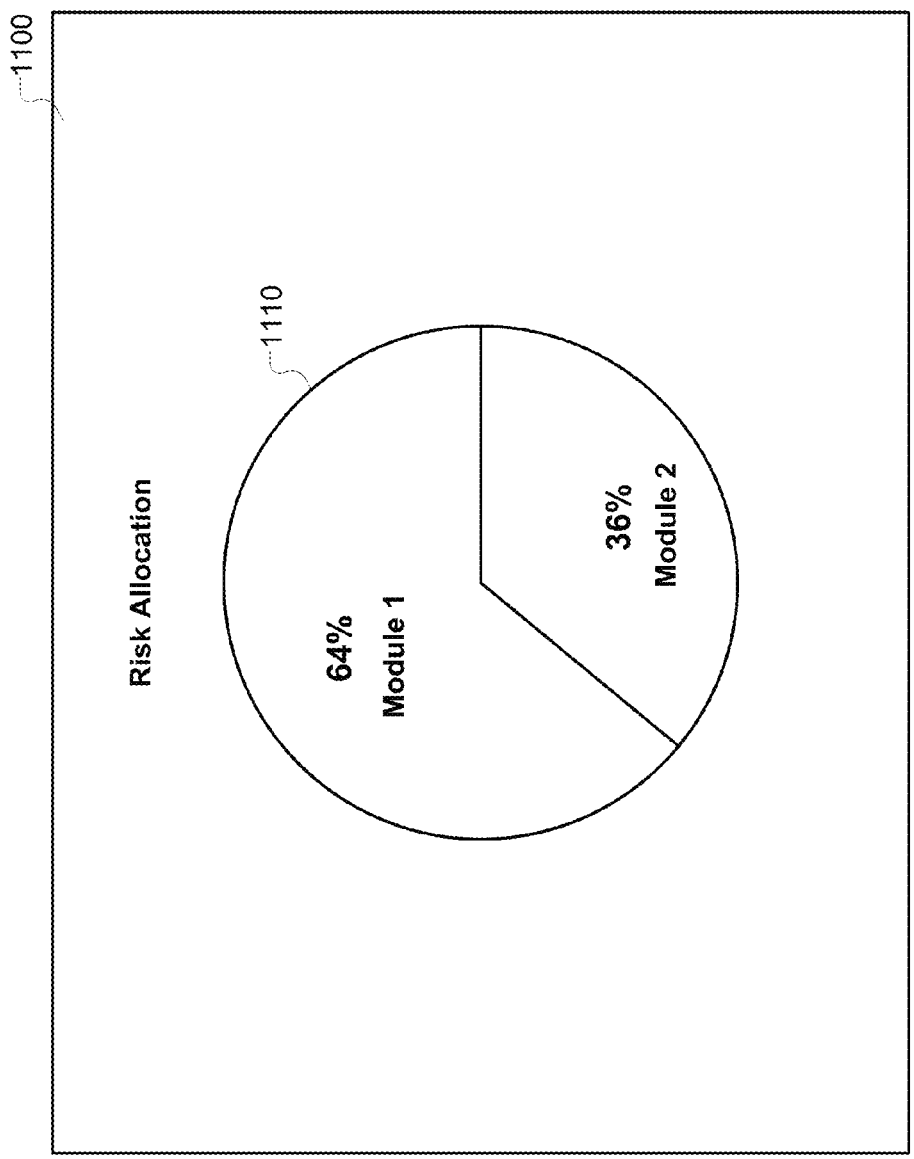
FIG. 11 illustrates a GUI configured to graphically depict a comparison of risks associated with first and second modules according to principles described herein.

FIG. 11 illustrates a GUI 1100 that may be generated and displayed by SRF generation facility 560 and that is configured to graphically depict a comparison of the relative risk associated with the first and second modules described in connection with Table 5. As shown in FIG. 11, GUI 1100 may include a pie chart 1110 configured to show a percentage of the overall risk that is associated with each module. The percentages may be based on the software risk factors corresponding to each module. For example, because the first module has a software risk value of "23" and the second module has a software risk value of "13," the overall software risk value is equal to 23+13, which equals "36." Hence, the percentage of the overall risk associated with the first module is equal to 23/36, which equals 64 percent. Likewise, the percentage of the overall risk associated with the second module is equal to 13/36, which equals 36 percent.

By viewing GUI 1100, a user of quality assurance subsystem 120 and/or development subsystem 110 may readily recognize that a greater percentage of the overall risk corresponding to the software product is associated with the first module than the second module. Based on this information, the user may decide to address defects identified within the first module before addressing defects identified within the second module.

In some examples, data associated with defects identified within a software instance may be transmitted by quality assurance subsystem 120 to development subsystem 110. The data may include data descriptive of the identified defects, data representative of one or more risk values, risk attributes, defect risk factors, software risk factors, and/or any other data related to the identified defects as may serve a particular application. In some examples, the development subsystem 110 may facilitate modification of the software instance in accordance with the transmitted data. For example, the development subsystem 110 may facilitate modification of the source code defining the software instance in order to address the identified defects.

Figure 12:
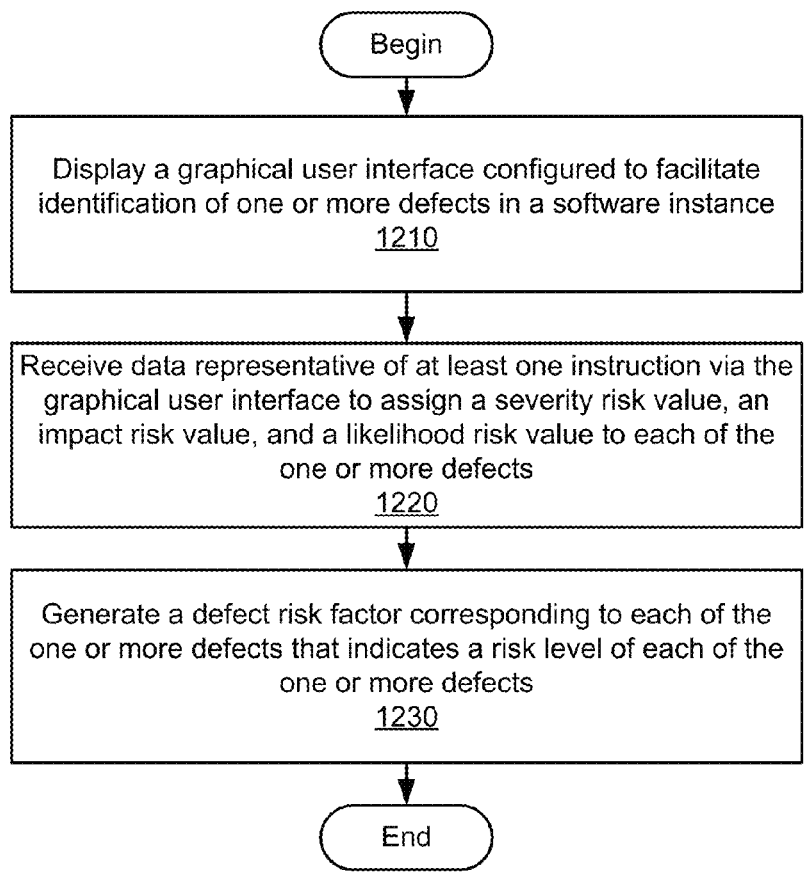
FIG. 12 illustrates an exemplary method of determining a risk level of one or more defects within a software instance according to principles described herein.

FIG. 12 illustrates an exemplary method of determining a risk level of one or more defects within a software instance. While FIG. 12 illustrates exemplary steps according to one embodiment, other embodiments may omit, add to, reorder, and/or modify any of the steps shown in FIG. 12.

In step 1210, a graphical user interface configured to facilitate identification of one or more defects in a software instance is displayed. The graphical user interface may be generated and displayed in any of the ways described herein. For example, the graphical user interface may be generated and displayed by quality assurance subsystem 120 and/or by any other device or system as may serve a particular application.

In step 1220, data representative of at least one instruction is received via the graphical user interface to assign a severity risk value, an impact risk value, and a likelihood risk value to each of the one or more defects. The at least one instruction may be received in any of the ways described herein. For example, at least one instruction may be received via the graphical user interface by quality assurance subsystem 120 to associate one of a plurality of defect severity levels, one of a plurality of impact levels, and one of a plurality of likelihood levels with each of the one or more defects.

In step 1230, a defect risk factor corresponding to each of the one or more defects that indicates a risk level of each of the one or more defects is generated. As described above, the generation of the defect risk factor may be based on a combination of the assigned severity risk values, impact risk values, and likelihood risk values corresponding to each of the one or more defects.

Figure 13:
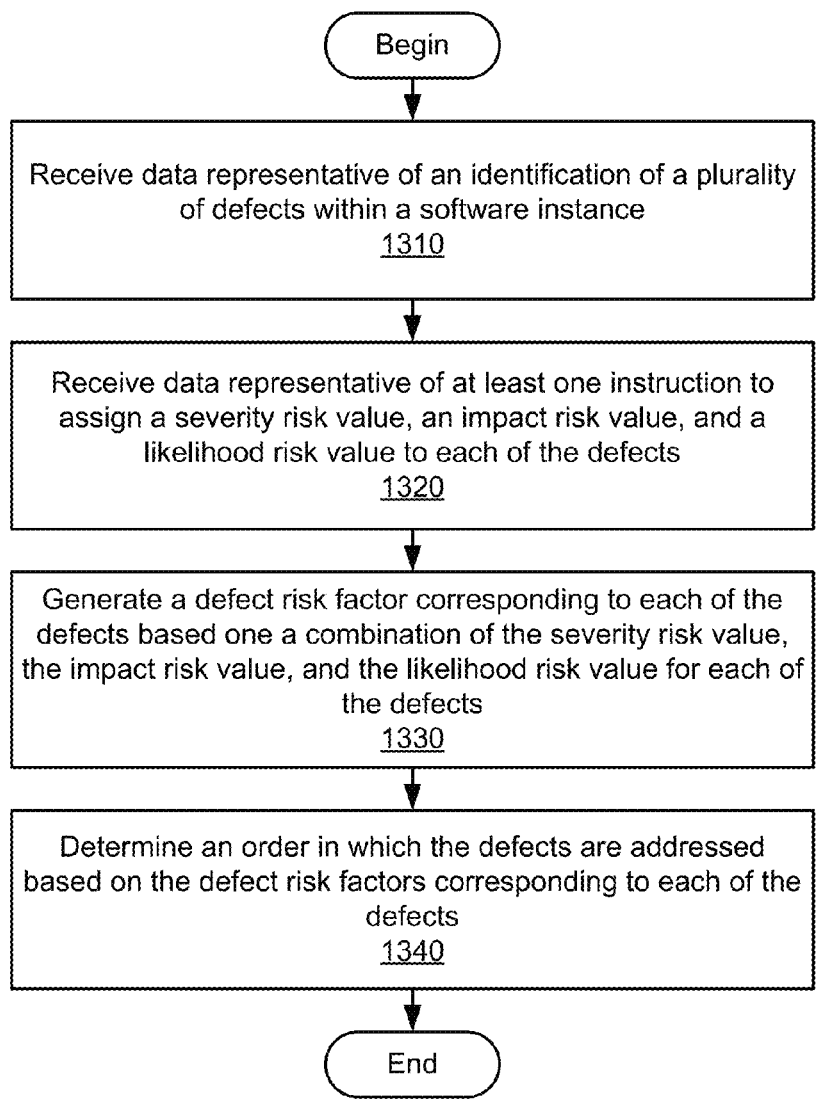
FIG. 13 illustrates an exemplary method of determining an order in which defects within a software instance are addressed according to principles described herein.

FIG. 13 illustrates an exemplary method of determining an order in which defects within a software instance are addressed. While FIG. 13 illustrates exemplary steps according to one embodiment, other embodiments may omit, add to, reorder, and/or modify any of the steps shown in FIG. 13.

In step 1310, data representative of an identification of a plurality of defects within a software instance is received. The data may be received in any of the ways described herein. For example, quality assurance subsystem 120 may receive the data.

In step 1320, data representative of at least one instruction to assign a severity risk value, an impact risk value, and a likelihood risk value to each of the defects is received. The at least one instruction may be received in any of the ways described herein. For example, the at least one instruction may be received by quality assurance subsystem 120.

In step 1330, a defect risk factor corresponding to each of the defects is generated based on a combination of the severity risk value, impact risk value, and likelihood risk value corresponding to each of the defects.

In step 1340, an order in which the defects are addressed is determined based on the defect risk factors corresponding to each of the defects. The order may be determined in any of the ways described herein.

In the preceding description, various exemplary embodiments have been described with reference to the accompanying drawings. It will, however, be evident that various modifications and changes may be made thereto, and additional embodiments may be implemented, without departing from the scope of the invention as set forth in the claims that follow. For example, certain features of one embodiment described herein may be combined with or substituted for features of another embodiment described herein. The description and drawings are accordingly to be regarded in an illustrative rather than a restrictive sense.

What is claimed is:

1. A method comprising:

displaying a graphical user interface configured to facilitate identification of one or more defects within a software instance;

receiving data, via said graphical user interface, representative of at least one instruction to assign a predefined numerical severity risk value, a predefined numerical impact risk value, and a predefined numerical likelihood risk value to each of said one or more defects, said severity risk value assigned to each of said one or more defects quantifying a degree to which each of said one or more defects will affect a functionality of said software instance, said impact risk value assigned to each of said one or more defects quantifying a degree to which each of said one or more defects will affect end user satisfaction with said software instance, and said likelihood risk value assigned to each of said one or more defects quantifying a likelihood that each of said one or more defects will occur during an execution of said software instance;

generating a defect risk factor corresponding to each of said one or more defects that indicates a risk level of each of said one or more defects, said generating based on a combination of said severity risk value, said impact risk value, and said likelihood risk value corresponding to each of said one or more defects; and generating a software risk factor corresponding to said software instance that indicates a risk level of said software instance by summing said defect risk factors corresponding to each of said one or more defects.

2. The method of claim 1, further comprising comparing said software risk factor to at least one other software risk factor corresponding to at least one other software instance to determine an order in which said software instance and said at least one other software instance are addressed.

3. The method of claim 1, wherein said severity risk value corresponds to one of a plurality of defect severity levels, said impact risk value corresponds to one of a plurality of impact levels, and said likelihood risk value corresponds to one of a plurality of likelihood levels.

4. The method of claim 3, wherein said data representative of said at least one instruction comprises at least one instruction to associate one of said defect severity levels, one of said impact levels, and one of said likelihood levels with each of said one or more defects.

5. The method of claim 3, further comprising facilitating manual adjustment of a relationship between said severity risk value and said plurality of defect severity levels, a relationship between said impact risk value and said plurality of impact levels, and a relationship between said likelihood risk value and said plurality of likelihood levels.

6. The method of claim 1, further comprising:
determining an order in which said one or more defects are addressed based on a descending order of said defect risk factor corresponding to each of said one or more defects.

7. The method of claim 1, wherein said software instance comprises one of a plurality of modules included within a software product.

8. The method of claim 1, tangibly embodied as computer-executable instructions on at least one computer-readable medium.

9. A method comprising:
receiving data representative of an identification of a plurality of defects within a software instance;
receiving data representative of at least one instruction to assign a predetermined numerical severity risk value, a predetermined numerical impact risk value, and a predetermined numerical likelihood risk value to each of said defects, said severity risk value assigned to each of said defects quantifying a degree to which each of said defects will affect a functionality of said software instance, said impact risk value assigned to each of said defects quantifying a degree to which each of said defects will affect end user satisfaction with said software instance, and said likelihood risk value assigned to each of said defects quantifying a likelihood that each of said defects will occur during an execution of said software instance;
generating a defect risk factor corresponding to each of said defects based on a combination of said severity risk value, said impact risk value, and said likelihood risk value for each of said defects;
determining an order in which said defects are addressed based on said defect risk factors corresponding to said defects; and
generating a software risk factor corresponding to said software instance that indicates a risk level of said software instance by summing said defect risk factors corresponding to each of said one or more defects.

10. The method of claim 9, wherein said order is based on a descending order of said defect risk factors.

11. The method of claim 9, wherein if said defect risk factors are identical for said defects, said determining of said order comprises basing said order on said severity risk values corresponding to said defects.

12. The method of claim 11, wherein if said severity risk values are identical for said defects, said determining of said order comprises basing said order on said impact risk values corresponding to said defects.

13. The method of claim 12, wherein if said impact risk values are identical for said defects, said determining of said order comprises basing said order on said likelihood risk values corresponding to said defects.

14. The method of claim 9, wherein said software instance comprises one of a plurality of modules included within a software product.

15. A system comprising:
a processing facility including at least one processor configured to direct a display to display a graphical user interface configured to facilitate identification of one or more defects in a software instance;
a defect risk factor generation facility communicatively coupled to said processing facility and configured to
assign a predetermined numerical severity risk value, a predetermined numerical impact risk value, and a predetermined numerical likelihood risk value to each of said one or more defects in response to at least one instruction received via said graphical user interface, said severity risk value assigned to each of said one or more defects quantifying a degree to which each of said one or more defects will affect a functionality of said software instance, said impact risk value assigned to each of said one or more defects quantifying a degree to which each of said one or more defects will affect end user satisfaction with said software instance, and said likelihood risk value assigned to each of said one or more defects quantifying a likelihood that each of said one or more defects will occur during an execution of said software instance, and
generate a defect risk factor for each of said one or more defects that indicates a
risk level of each of said one or more defects, said generation based on a combination of said severity risk value, said impact risk value, and said likelihood risk value corresponding to each of said one or more defects; and
a software risk factor generation facility communicatively coupled to said processing facility and configured to generate a software risk factor corresponding to said software instance that indicates a risk level of said software instance, said generation of said software risk factor based on a summation of said defect risk factors corresponding to each of said one or more defects.

16. The system of claim 15, wherein said software risk factor generation facility is further configured to compare said software risk factor to at least one other software risk factor corresponding to at least one other software instance to determine an order in which said software instance and said at least one other software instance are addressed.

17. The system of claim 15, wherein said defect risk factor generation
facility is further configured to determine an order in which said one or more defects are addressed based on a descending order of said one or more defect risk factors corresponding to said one or more defects.

18. The system of claim 17, wherein if said defect risk factors are identical for each of said defects, said defect risk factor generation facility is configured to base said order on said severity risk values corresponding to said defects.

* * * * *